United States Patent [19]

Drummond et al.

[11] Patent Number: 5,419,067
[45] Date of Patent: May 30, 1995

[54] TELESCOPING GARMENT HOLDER AND ASSIST HANDLE

[75] Inventors: Brian J. Drummond, Canton; Philip S. Lewis, Northville, both of Mich.

[73] Assignee: Ford Motor Company, Dearborn, Mich.

[21] Appl. No.: 151,697

[22] Filed: Nov. 15, 1993

[51] Int. Cl.6 .................................................. B60R 7/00
[52] U.S. Cl. ...................... 224/42.45 A; 224/42.45 R; 224/42.46 A
[58] Field of Search ...................... 224/42.45 A, 42.45, 224/42.46, 42.46 A; 223/85, 88, 89, 92, 94; 248/298, 308

[56] References Cited

U.S. PATENT DOCUMENTS

| | | | |
|---|---|---|---|
| 1,005,967 | 10/1911 | Hauser | 223/89 |
| 1,114,002 | 10/1914 | Kalina | 223/94 |
| 2,526,095 | 10/1950 | Storey | 224/275 |
| 2,663,470 | 12/1953 | Albert | 223/94 |
| 2,926,827 | 3/1960 | Joseph | 224/42.45 A |
| 2,947,457 | 8/1960 | Lentz | 224/42.45 A |
| 3,007,617 | 11/1961 | Mullin | 224/275 |
| 3,044,674 | 7/1962 | Levy | 224/42.34 |
| 3,386,589 | 6/1968 | Prete, Jr. | 211/118 |
| 4,645,106 | 2/1987 | Pawl | 224/313 |
| 4,720,028 | 1/1988 | Takemura et al. | 224/42.45 A |
| 4,778,089 | 10/1988 | White et al. | |
| 4,936,491 | 6/1990 | Calad et al. | 224/42.46 A |

FOREIGN PATENT DOCUMENTS

3801625A1 3/1989 Germany.

Primary Examiner—Robert M. Fetsuga
Assistant Examiner—David J. Walczak
Attorney, Agent, or Firm—Donald A. Wilkinson; Roger L. May

[57] ABSTRACT

A hanger assembly for use in a vehicle interior. The hanger assembly includes a handle member having a curved channel with openings at either end for receiving hanger members. The hanger members fit telescopically within the curved channel. They can be pulled by an occupant to an extended position for use as a garment holder or pushed into the channel in a stowed position when not in use. The hanger assembly can also include an handle member combined with the hanger members to allow occupants to use the handle member as an assist handle when entering and exiting the vehicle.

20 Claims, 3 Drawing Sheets

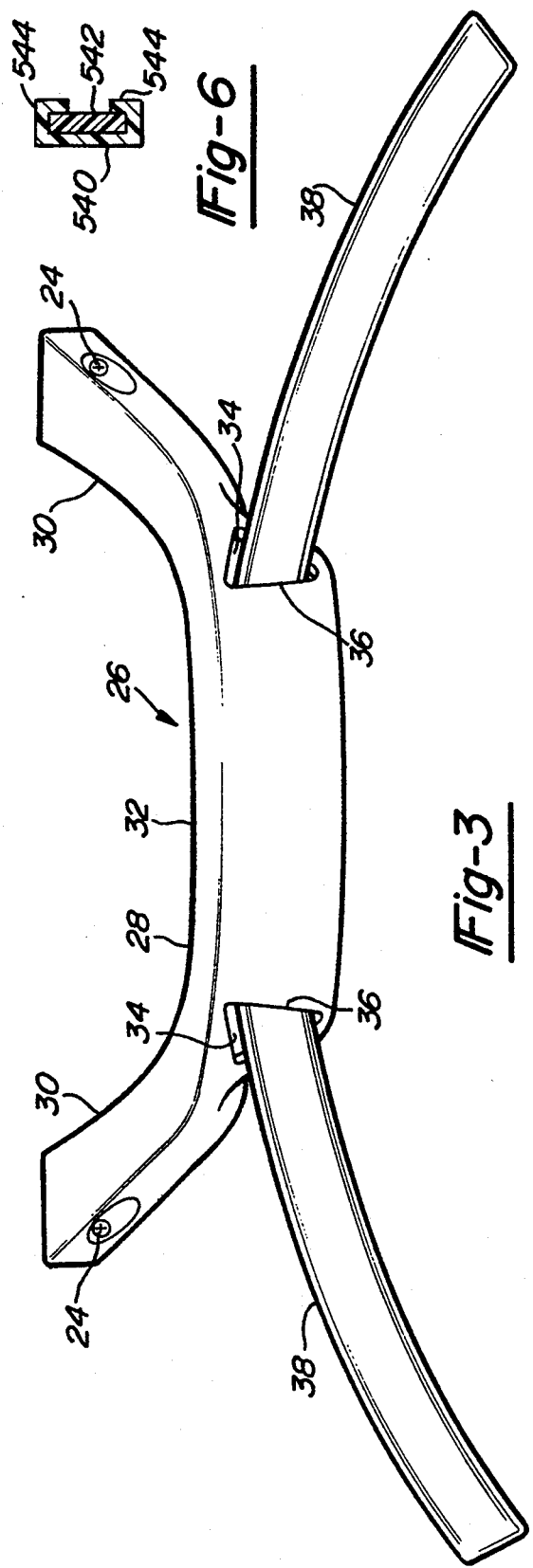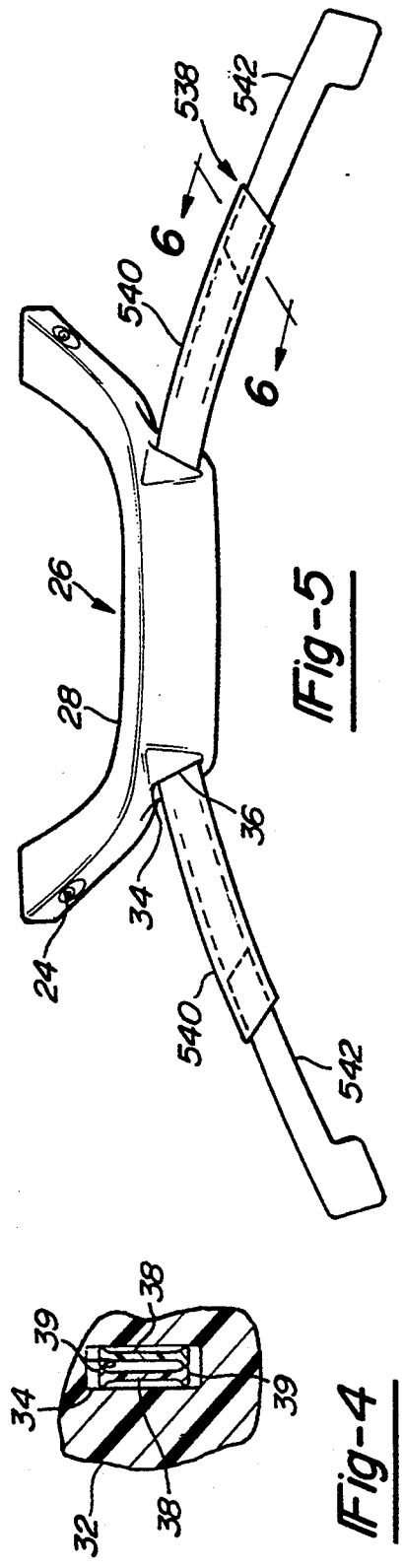

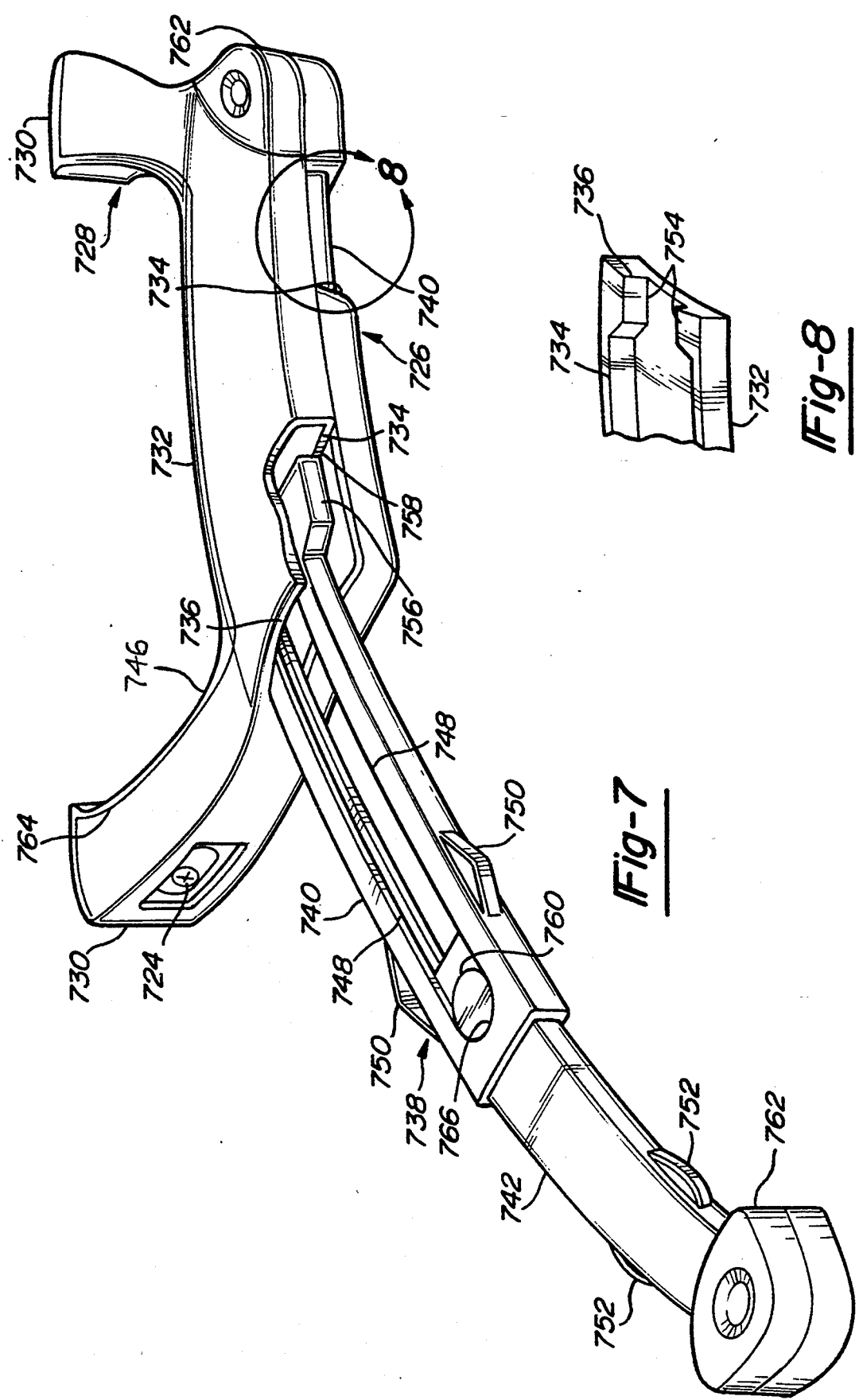

TELESCOPING GARMENT HOLDER AND ASSIST HANDLE

FIELD OF THE INVENTION

The present invention relates to a device for hanging garments in automotive vehicles, and also for providing an assist handle for use when entering and exiting a vehicle.

BACKGROUND OF THE INVENTION

Vehicles are typically equipped with a garment hook on the inside of the vehicle, normally over the rear side windows. This provides a place for an occupant of the vehicle to hang a garment to keep it neat. However, from time to time, the occupant may desire to have a hanger to better support the garment, avoiding unsightly creases that may arise due to the single hook support. A conventional hanger will help to avoid those creases, but can be an annoyance to the occupant when trying to store it while not in use.

A prior attempt to incorporate a hanger into a vehicle interior, as shown in U.S. Pat. No. 4,936,491, only pivots the hanger arms from a downward protruding position when in use to a stowed position, but does not remove any portion of the hanger arms from view, creating an unsightly appearance. Further, in vehicles where it is desired to have an assist handle over rear side doors, for helping occupants enter and exit the vehicle, a hanger having arms that merely pivot to a stored position can interfere with the use of the assist handle or may not allow for an assist handle at all.

Consequently, the need arises for a mechanism that will allow for the use of a garment holder over a side window of a vehicle that provides for concealment of the hanger arms when not in use. Further, the need arises for a garment holder that will not interfere with the placement and use of an assist handle mounted over a rear side door of a vehicle. Preferably, the mechanism combines the two components to reduce the number of parts and the space used in the vehicle interior.

SUMMARY OF THE INVENTION

In its embodiments, the present invention is directed to a hanger assembly for use in the interior of a vehicle. The hanger assembly includes a housing having a channel portion, with the housing affixed to the interior of the vehicle. The channel portion is provided with two openings. Hanger members are telescopically insertable within the channel portion through the openings to a first position extending from the housing for hanging a garment and a second position substantially enclosed within the housing, with the hanger members being slidable relative to one another between the two positions.

The present invention is also directed to a combination garment holder and assist handle for use in the interior of a vehicle. The present invention includes a handle member protruding from and affixed to the vehicle interior provided with a hollow channel. The channel is provided with an opening. A hanger member is insertable within the channel through the opening to a first retracted position and a second extended position, whereby a garment can be supported upon the hanger member when in the second position.

Accordingly, an object of the present invention is to provide a mechanism that will allow for the use of a garment holder over a side window in a vehicle, the arms of which can be stowed within a channel out of the way when not in use.

A further object of the present invention is to provide an assist handle mounted above a rear side window in a vehicle for occupants to use when entering and exiting the vehicle in combination with a garment holder having arms that can be stowed within a channel in the assist handle when not in use.

An advantage of the present invention resides in the fact that this device can be mounted in a vehicle over a rear door window to support garments when in its extended position and can be retracted and partially or wholly concealed when not in use.

A further advantage of the present invention is that a mechanism is provided in which both garment support and assist handle functions can be performed with the same mechanism, thereby saving space and reducing cost.

BRIEF DESCRIPTION OF THE DRAWINGS

Other objects and advantages will occur to those skilled in the automotive body arts upon reading the following description with reference to the accompanying drawings in which:

FIG. 3 is a view similar to FIG. 2 with the hanger member shown in a fully extended position;

FIG. 4 is a cross-sectional view taken along line 4—4 of FIG. 2;

FIG. 5 is a view similar to FIG. 3, showing an alternative embodiment of the hanger assembly in accordance with the present invention;

FIG. 6 is a cross-sectional view, on an enlarged scale, taken along line 6—6 in FIG. 5;

FIG. 7 is a perspective partially sectioned view of a second alternative embodiment of the present invention; and FIG. 8 is a view broken away from the encircled area 8 in FIG. 7.

DETAILED DESCRIPTION OF THE PREFERRED EMBODIMENTS

Figure 1:
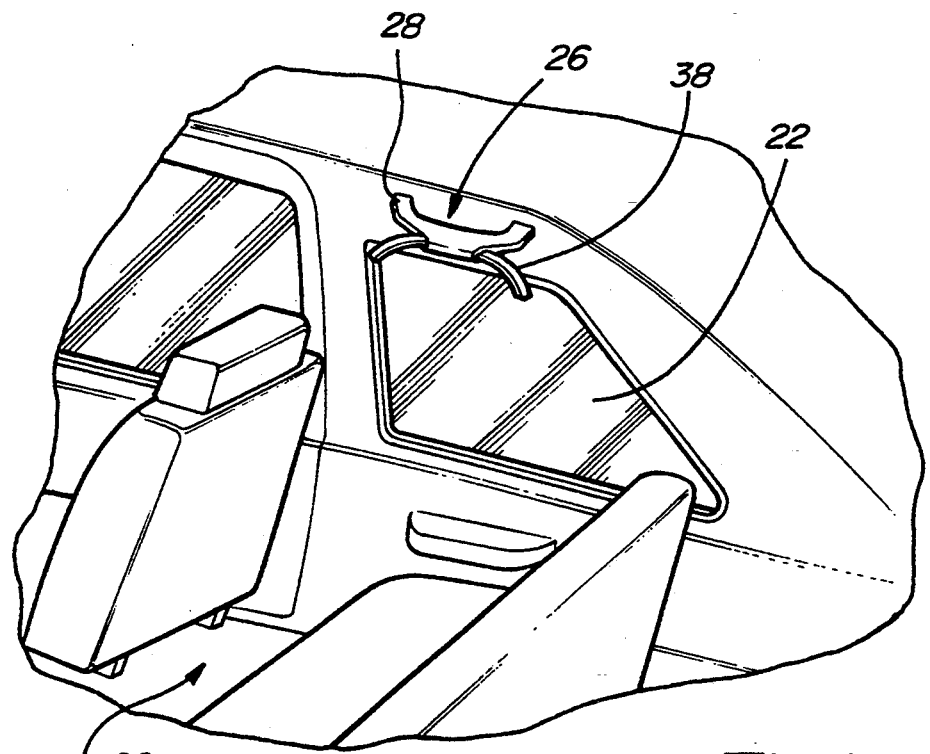
FIG. 1 is a perspective view of a hanger assembly shown mounted above a side window in a vehicle interior in accordance with the present invention.

Referring to FIGS. 1-4, a vehicle interior 20 is shown as having a side window 22. A hanger assembly is attached above the side window 22, to a typical handle support structure (not shown) capable of supporting an occupant's weight, using screws 24. The hanger assembly 26 includes a plastic handle member 28. The handle member 28 has two side mounting portions 30 and a central housing portion 32. The side mounting portions 30 receive the screws 24. Within the central housing portion 32 is a hollow curved channel 34, which is oriented generally longitudinally (i.e., fore-and-aft) along the vehicle interior 20.

At either end of the curved channel 34 are channel openings 36 sized for slidably receiving two hanger members 38. Each hanger member 38 preferably is made of plastic and is curved along its length for proper support of a garment. The curvature of the channel 34 is curved to match the hanger members 38, which allows the channel 34 to provide support along the length of the hanger members 38. The two hanger members 38 telescope within the curved channel 34, resting side-by-side along the curved path in sliding relationship.

The cross-sectional shape of each of the hanger members 38 is a "dog bone" shape having protruding tabs 39, as shown in FIG. 4. This cross-sectional shape allows the two hanger members 38 to slide along one another without sticking because only the tabs 39 contact one another.

Figure 2:
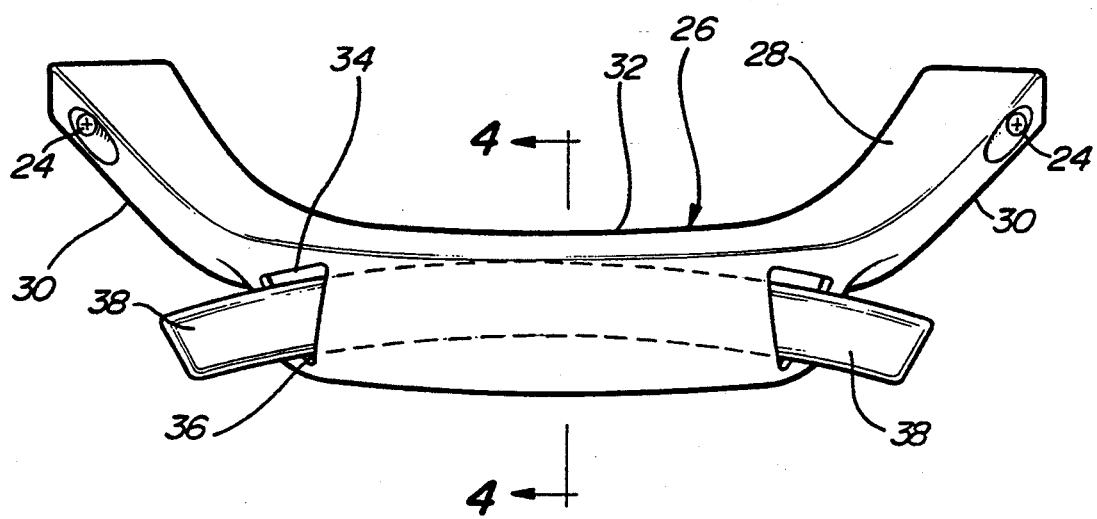
FIG. 2 is a side elevation view of a hanger assembly with the hanger member in a substantially retracted position in accordance with the present invention.

FIG. 2 shows, the hanger members 38 in their retracted position. In this position, the handle member 28 can be easily used by occupants to assist in entering and exiting a vehicle without interference from the hanger members 38. The hanger members 38 may be placed in this stowed position when not in use. The retracted hanger members 38 are substantially enclosed within the central housing 32 out of sight to increase the aesthetic appeal of the hanger assembly 26 when not in use. To use the hanger portions 38, all an occupant need do is pull on the ends of the two hanger portions 38 in opposite directions to extend them from the handle member 28.

FIG. 3 shows the hanger members 38 telescoped out to their extended position. In this position, the hanger members 38 can receive and support a garment just as a typical hanger would. Furthermore, in this position, the handle member 28 can still be used as an assist handle by the occupants if so desired. The hanger members 38 can be stowed again by pushing the hanger members 38 back into the curved channel 34 of the handle member 28.

An alternative embodiment is shown in FIGS. 5 and 6. In this embodiment, like numbers represent like elements corresponding to the first embodiment, and numbers having a "500" series prefix are unique to this alternative embodiment. Each of the hanger members 538 is an assembly of two parts, a primary hanger member 540 and a secondary hanger member 542. Each primary hanger member 540 has a C-shaped cross-section with a pair of flanges 544 protruding from opposite ends. The secondary members 542 are rectangular in cross-section and are each secured within a different one of the primary hanger members 540. Each primary hanger member 540, then, telescopes within the handle member 28 similar to the first embodiment. Each secondary hanger member 542, in turn, telescopes within its respective primary hanger member 540. This embodiment, with a pair of telescoping hanger members, allows the hanger assembly 26 to be more compact when the hanger members 540 and 542 are in their stowed position.

A second alternative embodiment, as shown in FIGS. 7 and 8, includes a pair of telescoping hanger members protruding from the hanger assembly 726 as described in the first alternative embodiment. The handle member 728 includes a metal reinforcing strip 764 along its handle surface 746 for giving more rigidity to the side mounting portions 730 and central housing portion 732. Screws 724 protrude through the reinforcing strip 764 to secure it to a vehicle. This type of reinforcing strip 764 can also be used in the first two embodiments described above.

The central housing portion 732 includes two curved central hollow channels 734, one each for enclosing a hanger member 738. A central channel wall 758 separates the two channels 734 from one another. Each of the central channels 734 has one channel opening 736, on opposite ends of the central housing portion 732. One primary hanger member 740 of each hanger member 738 is telescopically received within each of the channel openings 736. The channel openings 736 include hanger stops 754 and consequently have a smaller cross-sectional area than the main portion of each central channel 734.

Each primary hanger member 740 includes a hanger retaining flange 756 that will fit within the central channel 734 but will abut the hanger stops 754 when the hanger member 738 is fully extended. This prevents the hanger member 738 from pulling all of the way out of the central channel 734. Each primary hanger member 740 is shaped as a curved box section that defines primary hanger channels 748 and has a retainer portion 766 at one end of the channels 748 that defines a slot. The secondary hanger member 742 is shaped to telescopically slide within and be retained by the primary hanger channels 748. A retaining pin 760 protrudes from the secondary hanger member 742 and catches on the retainer portion 766 when the secondary hanger member 742 is fully extended, to retain the secondary hanger member 742 in the primary hanger member 740.

The primary hanger member 740 includes a pair of primary hanger clips 750, and the secondary hanger member includes a pair of secondary hanger clips 752. As the primary hanger member 740 is fully retracted, the primary hanger clips 750 will snap past the hanger stops 754 and into the central channel 758 to help retain the primary hanger member 740 in its retracted position. As the secondary hanger member 742 is retracted into the primary hanger member 740, the secondary hanger clips 752 will snap into engagement with the primary hanger clips 750 to help retain the secondary hanger member 742 in its retracted position. A pair of finger grips 762, one each affixed to one end of each secondary hanger member 742, allows an occupant to better grip the hanger members 738 when extending and retracting them. The finger grips 762 are also shaped to blend in with the curves of the handle member 728 to conceal the hanger members 738 and provide a more aesthetically pleasing assembly.

While only certain embodiments of the present invention have been described in detail, those familiar with the art to which this invention relates will recognize various alternative designs and embodiments for practicing the invention as defined by the following claims.

We claim:

1. A hanger assembly for use in the interior of a vehicle comprising:
 a housing adapted to be substantially permanently affixed to the interior of the vehicle at at least two points and provided with a substantially enclosed channel portion, the channel portion having two openings; and
 at least two hanger members telescopically insertable within the channel portion through the openings and telescopically slidable between a first position extending from the housing for hanging a garment and a second position substantially enclosed within the housing, with the hanger members being slidable relative to one another between the two positions.

2. A hanger assembly according to claim 1 wherein each hanger member comprises a primary hanger member and a secondary hanger member telescopically insertable within the primary hanger member.

3. A hanger assembly according to claim 1 wherein the hanger members are held adjacent to one another in sliding relationship within the channel portion and have a curvature, with the channel having a corresponding curvature to the hanger members to thereby provide support for the hanger members along substantially the entire portion of the hanger members extending within the channel.

4. A hanger assembly according to claim 1 wherein the shape of the housing is adapted to allow for an opening between the housing and the interior of the vehicle between the at least two points and includes a reinforcing strip carried with it to assure structural rigidity sufficient to allow the housing to be used as an assist handle.

5. A hanger assembly according to claim 1 wherein the housing includes a stop member for preventing each hanger member from being completely removed from the channel portion.

6. A combination garment holder and assist handle for use in the interior of a vehicle comprising:
   a handle member adapted to protrude from and be substantially permanently affixed to the vehicle interior, with the handle member being provided with a substantially enclosed hollow channel having an opening, and with the shape of the handle member being adapted to allow for an opening between the handle member and the interior of the vehicle; and
   a hanger member insertable within the channel through the opening to a retracted position and an extended position, whereby a garment can be supported upon the hanger member when in the extended position.

7. A combination garment holder and assist handle according to claim 6 wherein the hanger member telescopically extends from the handle member.

8. A combination garment holder and assist handle according to claim 6 wherein the channel is provided with two openings and the hanger member comprises two hanger portions telescopically slidable relative to one another.

9. A combination garment holder and assist handle according to claim 8 wherein the hollow channel includes two substantially enclosed channel portions, each provided with one of the two openings.

10. A combination garment holder and assist handle according to claim 6 wherein the channel is provided with two openings and the hanger member comprises two primary hanger members, each having a corresponding secondary hanger member mounted telescopically within it.

11. A combination garment holder and assist handle according to claim 10 wherein the hollow channel includes two substantially enclosed channel portions, each provided with one of the two openings.

12. A combination garment holder and assist handle according to claim 11 wherein the handle member has a reinforcing strip mounted thereto.

13. A combination garment holder and assist handle according to claim 6 wherein the hanger member includes a hanger clip carried with it to secure the hanger member in the retracted position relative to the handle member.

14. A combination garment holder and assist handle according to claim 6 wherein the handle member includes a stop member for preventing the hanger member from being completely removed from the channel portion.

15. A vehicle having an interior comprising:
   a side window and a support structure above the window in the interior of the vehicle;
   a hanger assembly including a housing substantially permanently affixed to the support structure of the vehicle in the interior of the vehicle and having a substantially enclosed channel portion, with the channel portion having two openings; and
   the hanger assembly further including hanger members telescopically insertable within the channel portion through the openings to a first position extending from the housing for hanging a garment and a second position substantially enclosed within the housing, the hanger members telescopically slidable relative to one another between the two positions.

16. A vehicle according to claim 15 wherein the housing has a reinforcing strip to assure structural rigidity sufficient to allow the housing to be used as an assist handle.

17. A vehicle according to claim 15 wherein each hanger member is comprised of a primary hanger member and a secondary hanger member telescopically insertable within the primary hanger member.

18. A vehicle according to claim 17 wherein the hanger members are held adjacent to one another in sliding relationship within the channel portion and have a curvature, with the channel having a corresponding curvature to the hanger members to thereby provide support for the hanger members along substantially the entire portion of the hanger members extending within the channel, and wherein the shape of the housing is adapted to allow for an opening between the housing and the support structure and includes a reinforcing strip carried with it to assure structural rigidity sufficient to allow the housing to be used as an assist handle.

19. A vehicle having an interior comprising:
   a support structure affixed to the interior of the vehicle;
   a combination garment holder and assist handle including a handle member protruding from and substantially permanently affixed to the support structure, with the handle member being provided with a substantially enclosed hollow channel having two openings, and with the shape of the handle member creating an opening between the handle member and the support structure; and
   the garment holder and assist handle further including two hanger members telescopically insertable within the channel through the openings to a retracted position and an extended position, whereby a garment can be supported upon the hanger members when in the extended position, with the hanger members further including hanger clips carried with them to secure the hanger members in the retracted position.

20. A hanger assembly according to claim 1 further including at least two screws wherein the housing is adapted to be substantially permanently affixed to the interior of the vehicle at the at least two points with the at least two screws.

* * * * *